Dec. 20, 1949  L. E. MENDEL ET AL  2,492,053
DEVICE FOR BROILING FOODS
Filed July 13, 1946
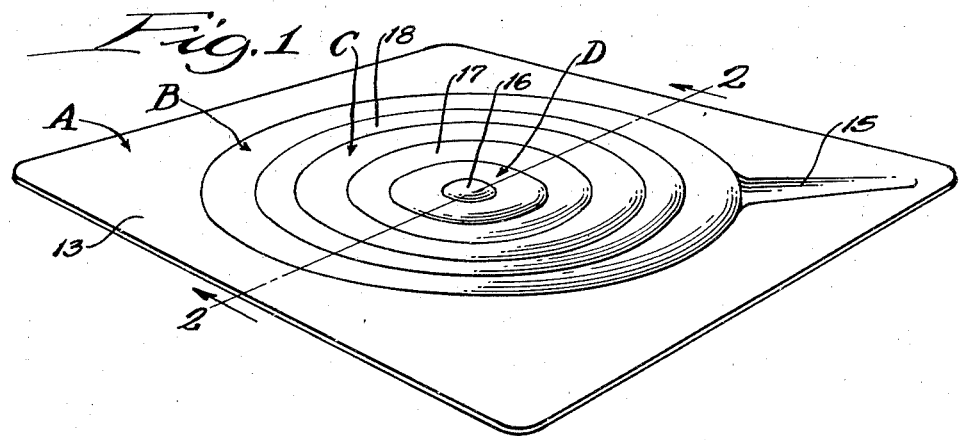
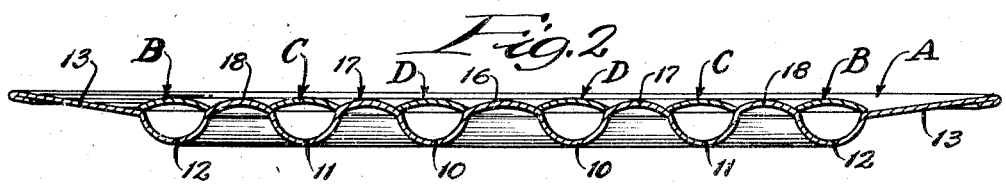
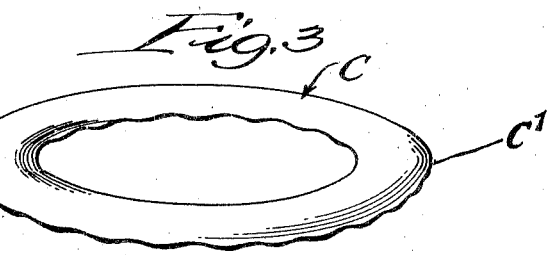
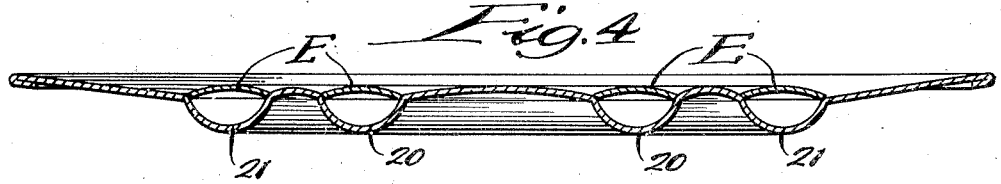
Inventors:
Leo E. Mendel,
Frederick J. Port and
Conrad J. Buhman,
By Dawson, Croth and Spangenberg,
Attorneys Patented Dec. 20, 1949

2,492,053

UNITED STATES PATENT OFFICE 2,492,053

DEVICE FOR BROILING FOODS

Leo E. Mendel, Frederick J. Port, and Conrad J. Buhman, Chicago, Ill., assignors to Cribben and Sexton Company, Chicago, Ill., a corporation of Illinois Application July 13, 1946, Serial No. 683,500

5 Claims. (Cl. 99—446)

1

This invention relates to a device for broiling foods, and more particularly to an improved broiler surface for supporting food during the broiling operation.

In the past, it has been common to employ wire racks, welded metal strips, or stamped or perforated surfaces for supporting food while broiling. All such structures have been accompanied by some sort of pan underneath the rack for catching the fat, and in all of them there are openings or perforations permitting draining of the fat from the grid to the pan underneath. If such openings are made sufficiently large to give adequate drainage, there is a substantial exposure of the fat in the pan to radiant heat from the heat source, and if the openings are small, drainage is retarded and the food tends to fry rather than broil.

An object of the invention is to provide a device which supports the food during broiling and which will quickly drain off the fat formed in the broiling operation. Another object is to provide structure which will facilitate removal of the fat and also shield it from radiant heat from the heat source during the remainder of the broiling operation. Yet another object is to provide such a broiler structure which presents a substantially uniform flat surface on which the food may rest. Yet another object of the invention is to provide such a broiler structure which is simple of construction and easy to clean.

One embodiment of the invention is illustrated in the accompanying drawing, in which—

Figure 1 is a perspective view of the improved device showing the broiler surface with the grids in place; Fig. 2 is a cross sectional view, the section being taken as indicated at line 2—2 of Fig. 1; Fig. 3 is an enlarged perspective view of one of the grids detached from the main base unit; and Fig. 4 is a view similar to Fig. 2 but showing two grids employed rather than the larger number shown in Fig. 2.

As illustrated in Figs. 1 to 3 inclusive, the improved device includes a main base unit A, and grids B, C and D.

The base unit A is, in the illustrated embodiment, rectangular in shape. It may be formed of steel or any suitable heat-resistant material and is adapted to slide into the broiler section of the ordinary household range. The top surface of this unit is provided with annular depressions 10, 11 and 12 which, as here illustrated, are circular and concentric. These depressions are cup-shaped in cross section, having inclined edges. As seen more clearly in Fig. 2 of the drawing, the areas 16, 17 and 18 between the depressions are arched with the surface being sloped toward the depressions. Also, the edge portions 13 of the unit are sloped toward the outermost of the depressions. Although three such annular depressions are illustrated, any number may be utilized, and although the annular form of depressions is preferred, it is understood that they may take any other form, as, for example, a series of parallel depressions or grooves.

The grid C, as shown in the drawing, is intended to overlie the annular depression 11. The general outline of the grid itself is more clearly shown in Fig. 3, and its placement on the main unit is more clearly shown in Fig. 2. The grid is generally circular in form and conforms to the general shape of the depression over which it is to serve. In cross section, it appears in arched form with the sides being sloped downwardly. The grid rests loosely on the main unit with its edges adjacent the edges of the depression 11. The edges are not fitted so tightly with the unit as to prevent passage of fat between the grid and the unit down into the well formed by the depression. Preferably, the edges of the grid have a somewhat irregular or wavy surface C' so that at intervals about its circumference the grid will always be spaced a slight distance from the main unit. Instead of having open edges, as illustrated, the extreme edge may be turned back, and in fact may be joined in the manner of a tube, such as a tube of oval cross section or even a solid bar grid may be used.

The grids B and D are each similar to the grid C already described, except that they are of different size and adapted to cover the depressions or wells 12 and 10.

If desired, the wells may connect with an outwardly-extending depression 15 which serves as a spout to pour off the fat after the broiling operation is completed. Where, as in the illustrated embodiment, the concentric annular depressions are used, the spout may connect with only the outer ring well 12.

When the improved device is to be used in broiling, the grids B, C and D are put in place and the food placed over them on the broiler surface. As the food broils, fat or juices will be released in the form of liquid, and this will drain from the grids into the well. Liquid falling on the top surface of the grids will drain off sidewise onto the main unit, and liquid from the areas 16, 17 and 18 between the wells will drain each way into one or another of the adjacent wells.

Since the grids are loosely fitted, the fat or other liquid may pass between the edges of the grid and the body unit downwardly into the well.

Once the fat or other juice is in the well, it is shielded by the grid from any direct radiation from the heat source. Thus, it is kept relatively cool and below its smoke point during the broiling period. In this construction, the grid is imperforate and there are no openings through which heat radiation may pass.

The broiler surface on which the food rests is substantially uniform and approximately flat, being subject to just enough curvature to permit easy draining. The regular appearance of the broiler surface is attractive and will permit the addition of smaller pieces of food on the surface along with a main larger piece. The structure is simple and eliminates any need for a double overall structure, such as the ordinary overall grid with the pan underneath. Less material is needed to construct the improved broiler structure and therefore the weight is less than ordinarily necessary.

When the broiling operation is over, the attendant may remove the broiled food and then remove each of the grids B, C and D. The fat may then be poured off by tipping the main unit to cause the fat to pass along the spout 15 and off into a suitable container. There being no sharp corners or narrow crevices in any of the structure, it is very easy to clean. It may be noted also that the absence of perforations is a great advantage with respect to keeping the device clean.

In the modification shown in Fig. 4, the unit is provided with an inner well 20 and an outer well 21. The inner well 20 is covered with a grid E, and the outer well 21 is covered with a grid F. For most purposes, the structure shown in Fig. 4 is preferred over that shown in Fig. 2 in that there are fewer surfaces to clean and fewer grids to handle. It will be understood, however, that any desired number of wells or grids may be employed.

The foregoing detailed description of one embodiment of the invention has been given only for purpose of explanation, and it is understood that many other constructions and modifications may be made all within the spirit of the invention.

We claim:

1. A broiler pan comprising a tray having spaced portions pressed downwardly to form channels extending below the plane of the tray top, the tray being bowed upwardly between the channels to provide drain surfaces, and grids arched in cross section and having their edges resting on said tray adjacent the edges of said depression to provide covers for said channels, the edges of said grids being spaced from said tray at intervals along its periphery to provide lateral passages through which juices from said flow surfaces may pass into said channels.

2. A broiler pan comprising a tray having spaced portions thereof turned downwardly to form arcuate channels adapted to receive juices, said tray having its portions between said channels bowed upwardly along their centers to provide drain surfaces extending downwardly toward the channels, and arcuate grids extending over said channels and having their edges spaced from said tray at intervals to permit the flow of juices along said drain surfaces to enter said channels, said channels and said arcuate grids providing a chamber between them of generally elliptical shape.

3. A broiler pan comprising a tray adapted to support food to be broiled, the top surface of said tray having spaced annular depressions therein forming wells for collecting juices released during the broiling operation, and an annular grid extending over each of said wells and being arched in cross section, said grids having waved edges providing lateral openings through which juices may drain under said grids and into said wells.

4. A broiler pan comprising a tray adapted to support food to be broiled, the top surface of said tray having spaced annular depressions therein forming wells for collecting juices released during the broiling operation, and an annular grid extending over each of said wells and being arched in cross section, said grids having waved edges providing lateral openings through which juices may drain under said grids and into said wells, said tray having upwardly-arched portions between said wells to provide drain surfaces leading juices into said openings between the grids and the tray.

5. A broiler pan comprising a tray having annular depressions therein forming juice-receiving wells, the tray portions between the wells being arched, and annular grids also arched in cross section extending over said wells, the edges of said grids being spaced at points from said tray to provide openings into said wells, the crest of the arched portions between the wells and the crest of the arched grids being substantially in the same plane.

LEO E. MENDEL.
FREDERICK J. PORT.
CONRAD J. BUHMAN.

REFERENCES CITED

The following references are of record in the file of this patent:

UNITED STATES PATENTS

| Number | Name | Date |
|---|---|---|
| 195,995 | Edwards | Oct. 9, 1877 |
| 1,007,323 | Betts | Oct. 31, 1911 |
| 1,057,449 | Noreck | Apr. 1, 1913 |
| 1,802,005 | Detwiler | Apr. 21, 1931 |
| 1,956,387 | Hartman | Apr. 24, 1934 |
| 2,028,649 | Conroy | Jan. 21, 1936 |

FOREIGN PATENTS

| Number | Country | Date |
|---|---|---|
| 6,749 | Great Britain | Mar. 30, 1905 |